(12) United States Patent
Chen et al.

(10) Patent No.: US 7,197,226 B2
(45) Date of Patent: Mar. 27, 2007

(54) POLYMERIC COMPOSITIONS COMPRISING QUANTUM DOTS, OPTICAL DEVICES COMPRISING THESE COMPOSITIONS AND METHODS FOR PREPARING SAME

(75) Inventors: Gang Chen, New Providence, NJ (US); Dan Fuchs, Summit, NJ (US); Ylva Olsson, New Providence, NJ (US); Ronen Rapaport, Chatham, NJ (US); Vikram Sundar, Millwood, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/402,693

(22) Filed: Apr. 11, 2006

(65) Prior Publication Data

US 2006/0208223 A1     Sep. 21, 2006

Related U.S. Application Data

(62) Division of application No. 10/724,174, filed on Dec. 1, 2003, now Pat. No. 7,065,285.

(51) Int. Cl.
*G02B 6/00*     (2006.01)

(52) U.S. Cl. .................. 385/141; 385/142; 385/143
(58) Field of Classification Search ......... 385/141–143
See application file for complete search history.

(56) References Cited

U.S. PATENT DOCUMENTS

| | | | |
|---|---|---|---|
| 2003/0136946 A1* | 7/2003 | Kumacheva | 252/500 |
| 2004/0203170 A1* | 10/2004 | Barbera-Guillem | 436/164 |
| 2005/0064435 A1* | 3/2005 | Su et al. | 435/6 |

* cited by examiner

*Primary Examiner*—Kaveh Kianni

(57) ABSTRACT

The present invention relates to a polymeric composition of matter. The composition includes at least one polymer matrix and plurality of quantum dots distributed therein. The polymer may be a perfluorocyclobutane polymer having high optical transmission at telecommunications wavelengths. The quantum dots may include cap compounds to increase the solubility of the quantum dots in the composition. Typical cap compounds include aromatic organic molecules. Optical devices including waveguides may be fabricated from the polymeric compositions of the invention.

7 Claims, 3 Drawing Sheets

POLYMERIC COMPOSITIONS COMPRISING QUANTUM DOTS, OPTICAL DEVICES COMPRISING THESE COMPOSITIONS AND METHODS FOR PREPARING SAME

CROSS-REFERENCE TO RELATED APPLICATIONS

This application is a divisional of U.S. patent application Ser. No. 10/724,174, filed Dec. 1, 2003 now U.S. Pat. No. 7,065,285, titled POLYMERIC COMPOSITIONS COMPRISING QUANTUM DOTS, OPTICAL DEVICES COMPRISING THESE COMPOSITIONS AND METHODS FOR PREPARING SAME, which is incorporated by reference in this application in its entirety.

FIELD OF THE INVENTION

The present invention relates to compositions comprising quantum dots and optical devices comprising these compositions.

BACKGROUND OF THE INVENTION

Photonic devices include waveguides, switches, splitters, and light sources. It is often desirable to incorporate luminescent materials within photonic devices. For example, lasers and other optical amplifiers may be prepared using fluorescent materials. Quantum dots provide many desirable optical properties, including luminescence and tunability by changing dot size.

SUMMARY OF THE INVENTION

One aspect of the present invention relates to a composition of matter comprising a polymer matrix comprising a plurality of carbon-fluorine bonds and a plurality of quantum dots distributed within the polymer matrix. The quantum dots may comprise an organic cap compound comprising an aromatic group. The polymer matrix may comprise a perfluorocyclobutane polymer.

In one embodiment, the polymer matrix comprises a plurality of polymer chains, each polymer chain (a) comprising at least 10 repeat units and (b) being cross linked at least twice to at least one of the other polymer chains. The polymer matrix may comprise aromatic groups.

In some embodiments, neither the quantum dots nor cap compounds if present are covalently bound to the polymer matrix.

The polymer of the composition may comprise repeat units linked by groups having a plurality of carbon-halogen bonds, e.g., carbon-fluorine bonds. The linking group may comprise a cyclic group having at least 3 carbon atoms, at least 2 of said carbon atoms may be bonded to one or more fluorine atoms. The polymer may comprise a perfluorocyclobutane polymer.

The composition of matter may be configured as a portion of a waveguide or a non-waveguide optical device.

In some embodiments, the composition of matter comprises a polymer having a number $N^A$ of aliphatic carbon-hydrogen bonds and a number $N^T$ of total bonds, wherein the ratio $N^A/N^T$ is less than about 0.4 and may be less than 0.3, less than about 0.25, less than about 0.15, less than about 0.1, or less than about 0.025.

The polymer may comprise a number $N^{Ha}$ total carbon-halogen bonds, with the ratio $N^A/N^{Ha}$ being less than about 1 or less than about 0.5. Substantially all or all of the $N^{Ha}$ carbon-halogen bonds may be carbon-fluorine bonds.

Another aspect of the invention relates to an optical waveguide comprising an optical core having a polymer matrix that comprises carbon-fluorine bonds and quantum dots distributed within the polymer matrix.

The waveguide may be a one-dimensional (1D) waveguide. Herein, a 1D waveguide has a single direction of light propagation therein. A one-dimensional waveguide is not a slab waveguide.

The quantum dots may comprise an organic cap compound with an aromatic group.

The polymer may comprise a number $NA$ aliphatic carbon-hydrogen bonds and a number $NT$ total bonds, wherein the ratio $NA/NT$ is less than about 0.3.

The polymer matrix may comprise aromatic groups.

Another aspect of the invention relates to a method of preparing an optical waveguide. The method includes combining a polymerizable resin and a plurality of quantum dots to prepare a mixture. The polymerizable resin molecules include a plurality of carbon-fluorine bonds. The also includes initiating polymerization of the polymerizable resin. The polymerizable resin includes a monomer or oligomer molecules. The monomer or oligomer molecules have aromatic groups. Upon polymerization, the polymerizable resin may form a polyfluorocyclobutane polymer.

The quantum dots may include an organic cap having an aromatic group.

The polymerizable resin may comprise a number $NA$ aliphatic carbon-hydrogen bonds and a number $NT$ total bonds, wherein the ratio $NA/NT$ is less than about 0.3.

BRIEF DESCRIPTION OF THE DRAWING

The present invention is discussed below in reference to the Drawings, in which.

DETAILED DESCRIPTION OF THE PREFERRED EMBODIMENT

Figure 1:
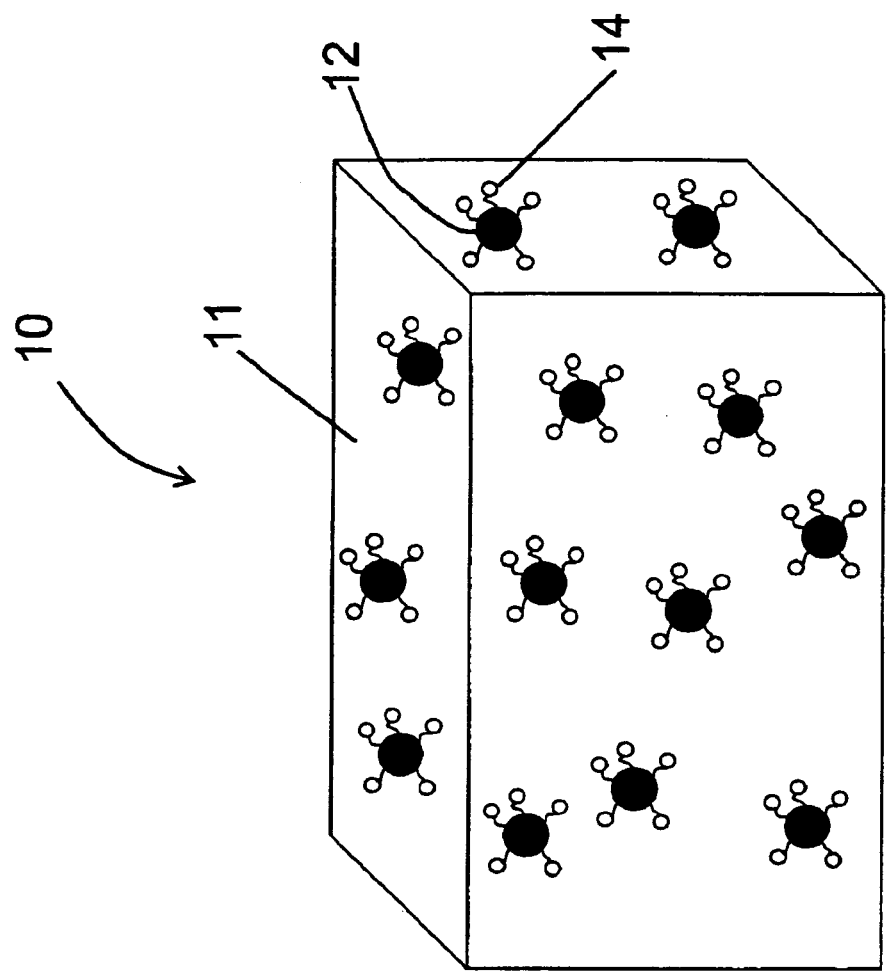
FIG. 1 shows a polymeric composition of the invention.
Figure 2:
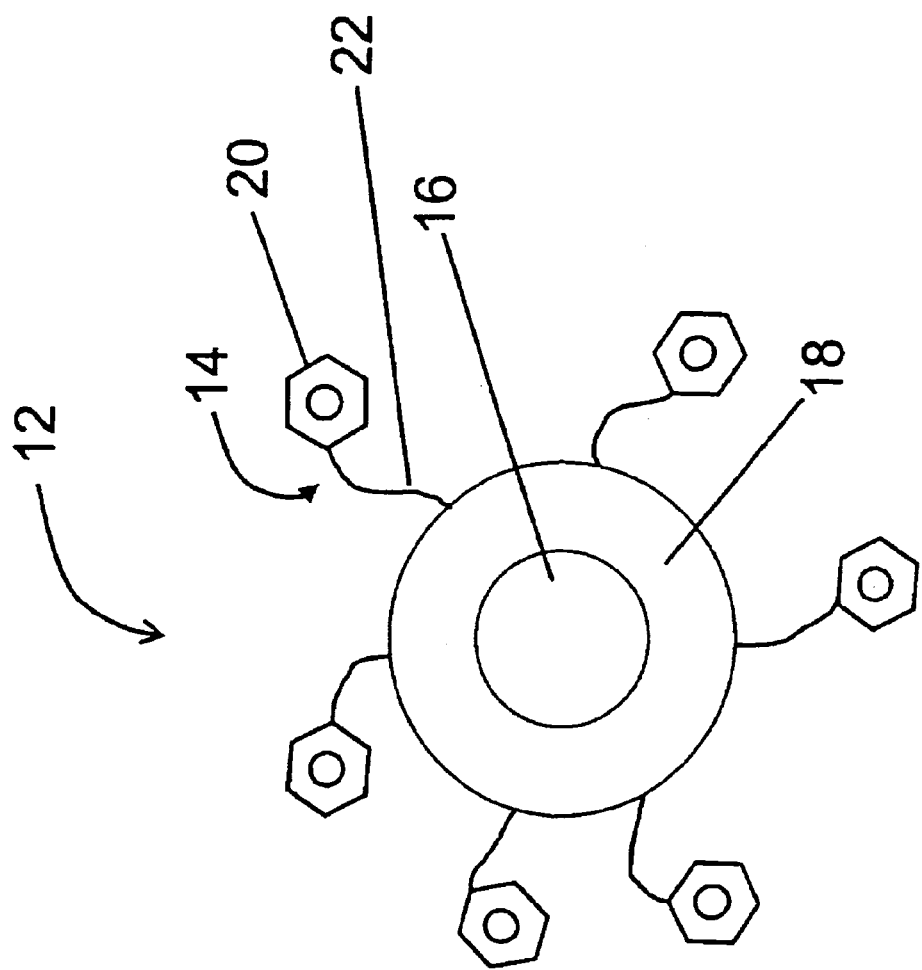
FIG. 2 shows a quantum dot with cap compound suitable for use with the present invention.

Referring to FIGS. 1 and 2, the present invention relates to a polymeric composition 10 comprising a polymer matrix 11 comprising a distribution of quantum dots 12. Preferred polymer matrices are formed of fluorinated polymer molecules comprising a plurality of carbon-fluorine bonds. Suitable fluorinated polymer molecules include perfluorocyclobutane (PFCB) polymers. The quantum dots 12 are preferably uniformly distributed within the polymer matrix. As seen in FIG. 2, the quantum dots may include a cap compound 14. Preferred cap compounds increase the solubility of the quantum dots and polymer, so as to inhibit aggregation of the quantum dots during preparation of the polymeric composition.

Figure 3:
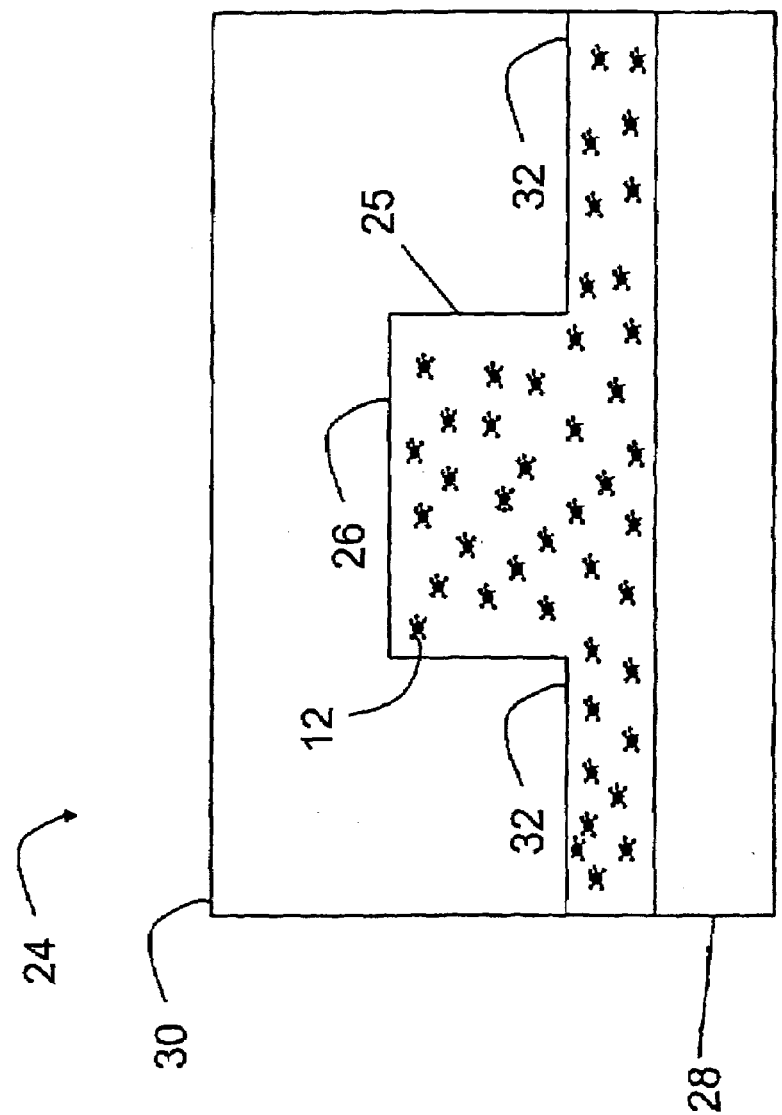
FIG. 3 illustrates an end-on view of a waveguide in accordance with the present invention.

Referring to FIG. 3, a ridge waveguide 24 comprises an optical core layer 26 formed of a polymeric composition, a substrate 28 that also serves as a lower cladding, and an upper cladding layer 30. In the core layer 26, the polymeric composition comprising polymer matrix 11 comprises a uniform distribution of quantum dots 12 therein. The polymeric composition 10 is optically transmitting and homogeneous so that light propagates therein. Preferred polymeric compositions have a large optical transmittance within in at least one wavelength window between about 800 and 1600 nanometers where the waveguide 24 operates. The waveguide 24 also includes a ridge 25 that functions as an optical core in which light is confined, because the refractive index of the cladding layers 28 and 30 is smaller than the refractive index of the core layer 26.

Optical devices that may be fabricated using polymer compositions of the present invention include waveguides, amplifiers, light sources, splitters, multiplexers, demultiplexers, attenuators, modulators, switches, and combinations of such structures. As used herein, the term "optical device" includes photonics devices.

These and other aspects of the present invention are discussed further below.

1. Quantum Dots

Quantum dots 12 useful in the present invention include semiconductor nanocrystals that are capable of at least one of absorption and luminescence when excited by a source of energy. Exemplary sources of energy include electrical energy sources and sources of electromagnetic energy, for example, lasers and light emitting diodes. Suitable semiconductor nanocrystal materials include MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, HgTe, GaAs, InGaAs, InP, PbSe, PbS, InAs, and combinations thereof. Various alloys including one or more of these materials are also included.

The quantum dots may be prepared using known techniques, such as those discussed in U.S. Pat. Nos. 5,505,928, 5,262,357, and 5,751,018, all to Alivisatos et al. and the articles Cao and Banin, J. Am. Chem. Soc., 122, 9629–9702 (2000) and Murray, Kagan, and Bawendi, Ann. Rev. Mater Sci., 30, 545–610 (2000). Each of these patents and articles is incorporated herein by reference.

Quantum dots 12 that are particularly useful in the present invention may have an absorption spectrum within the visible wavelengths, the infrared (IR) wavelengths, the near-infrared (NIR) wavelengths, or some combination thereof. In one embodiment, the quantum dots 12 have an absorption spectrum within the IR and/or NIR wavelengths, for example from about 750 nm to about 2000 nm, from about 1000 nm to about 1700 nm, or from about 1300 nm to about 1550 nm. The quantum dots may exhibit absorption at about 850 nm.

In addition to, or as an alternative to, having an absorption spectrum within these wavelength ranges, quantum dots useful in the invention may luminesce within the visible wavelengths, the IR wavelengths, the NIR wavelengths, or some combination thereof. In one embodiment, the quantum dots have a luminescence spectrum including at least one maximum within the IR and/or NIR wavelengths, for example from about 800 nm to about 2000 nm, from about 1200 nm to about 1700 nm, or from about 1300 nm to about 1550 nm. Preferred luminescence is photoluminescence.

As best seen in FIG. 2, Quantum dots 12 suitable for use in the present invention may have a core/shell configuration wherein the quantum dot comprises a semiconductor core 16 and at least one shell 18 comprising another, preferably semiconductor, material overlying the core 16. An exemplary shell 18 comprises ZnS. Preferred core diameters range from about 20 Å to about 100 Å. In some embodiments where the quantum dots 12 have a core/shell morphology, the core of the quantum dot may have a thickness/diameter of less than about 15 nm, preferably less than about 10 nm, for example from about 2 nm to about 9 nm, or from about 4 nm to about 8.5 nm. Preferred shell thicknesses range from about 1 atomic monolayer to about 25 Å. In some embodiments where the quantum dots have a core/shell morphology, the shell of the quantum dot may have a radial thickness (not including any layer of associated cap compound 20) of less than about 5 nm, preferably less than about 3 nm, for example from about 0.25 nm to about 2.5 nm. In other embodiments where the core 16 of the quantum dots 12 does not have a shell layer disposed therearound, the quantum dot 12 may advantageously have an average diameter (not including any layer of associated cap compound 20) of less than about 15 nm, preferably less than about 10 nm, for example from about 2 nm to about 9 nm.

The shell layer 18 may passivate the surface of the quantum dot's core 16, thereby protecting the core material from environmental factors that might adversely impact desirable optical properties of the core material. The shell layer 18 may comprise materials possessing a semiconductor band gap greater than that of the core material, while preferably also having essentially no effect on the optical properties, for example, the wavelengths of peak absorbance and/or emission of the core material. Thus, a preferred shell modifies an energy of a peak optical emission of the core 16 in the absence of the shell by about 5% or less or about 2% or less.

More than one shell 18 may be provided. For example, it is advantageous to provide an intermediate shell (not shown) to prevent direct contact between core and shell materials having mismatched lattice sizes or some other incompatibility. A preferred intermediate shell material operates as a chemical and/or physical bridge between the core material and the outer shell. In the case of mismatched crystalline dimensions, the intermediate shell may eliminate or minimize lattice strain associated with the transition between mismatched crystalline lattices of the core material 16 and shell material. Thus, for example, an InAs core may be provided with a CdSe first shell and a ZnS outer shell. In one preferred embodiment, the coating material of the shell comprises zinc sulfide, cadmium selenide, an alloy comprising at least one of these materials, or combination thereof. In another preferred embodiment, the coating material of the shell comprises a single compound/alloy material such as zinc sulfide or zinc selenide.

1.1 Cap Compounds

Quantum dots 12 in accordance with the present invention may comprise one or more associated cap compounds 14. A cap compound provides increased compatibility with organic compounds such as solvents and/or polymers (i.e., including the monomer(s) and/or oligomer(s) from which the polymers are prepared). As an example of increased compatibility, the cap compounds stabilize a distribution of quantum dots within a composition that will be polymerized to prepare a polymer matrix. Prior to polymerization, the viscosity of such compositions is often insufficiently high to prevent aggregation and/or sedimentation of the distributed quantum dots. Aggregate formation is generally undesirable both because the aggregates may scatter light and because a composition having a uniform distribution of quantum dots is desirable. The increased compatibility provided by the cap compounds stabilizes the distribution of quantum dots to the extent that aggregation and/or sedimentation is inhibited as compared to a distribution of uncapped quantum dots. Once polymerization and/or crosslinking has proceeded to a sufficient extent, aggregation and/or sedimentation of the distributed quantum dots is inhibited by the increased viscosity of the polymer matrix 11.

The association of the cap compound 14 with the quantum dot 12 is through at least one bond, which includes at least one of a covalent bond and at least one hydrogen bond. Thus, cap compounds preferably do not dissociate, if at all, from the quantum dots in a polymerizable composition at least until the freedom of movement of the quantum dots within the polymerizing composition is sufficiently small to prevent aggregation or sedimentation of the quantum dots.

Dissociation is breaking the bond between the cap compound and quantum dot so that the cap compound is free to move away from the quantum dot.

Cap compound 14 may comprise an organic group 20. Organic group 20 may include a conjugated and/or aromatic group, such as one or more rings comprising 4, 5, 6 or more carbon atoms. Exemplary organic cap compounds include phenyl, thiophenol, aniline, tri-octylphosphine, triphenylphosphine, triphenylphosphine oxide, trioctylphosphine oxide, diphenyl ether, like groups, or a combination thereof. Additionally or alternately, where the monomeric and polymeric matrix materials contain fluorinated moieties. (e.g., perfluorovinyl ether groups such as —O—CF=CF$_2$), the non-functional portion of the organic caps may contain similar or identical fluorinated moieties. It should be understood, however, that cap compounds free of carbon-halogen bonds, such as carbon-fluorine bonds, may be used.

Further, while quantum dot cap compounds according to the invention may have a relatively low molecular weight (e.g., less than about 300 Daltons, or less than about 1000 g/mol, or less than about 500 g/mol), oligmeric and/or (co)polymeric caps having similar or higher molecular weights are also contemplated. For example, where the polymeric matrix materials comprise conjugated and/or aromatic groups, a functionalized styrene (co)polymer, for example, may be used as the cap material. In this embodiment, the (co)polymer may comprise such monomers as styrene sulfonic acid, vinyl phenol, vinyl aniline, vinyl pyridine, salts thereof, or the like, or combinations thereof with each other and/or with un-functionalized styrene. Additionally or alternately, oligomeric and/or (co)polymeric cap compounds may advantageously comprise moieties that are compatible with (e.g., soluble in) portions of the pre-polymerized or post-polymerized polymeric matrix material.

The organic cap compounds may contain relatively few aliphatic carbon-hydrogen bonds in comparison to the other bonds in the cap compounds. For instance, the organic cap compound may comprise substantially no aliphatic carbon-hydrogen bonds. Cap compounds comprising inorganic groups are also contemplated.

Cap compounds comprise a functional portion 22 to associate with the quantum dot, such as through its surface. A preferred functional portion 22 of a cap compound comprises a sulfur atom. The quantum dot may include a surface coating that enhances the association of the cap compound with the quantum dot. The surface coating may be the shell of the quantum dot as discussed elsewhere herein. The surface coating may comprise a layer of glass, such as silica (SiO$_x$ where x=1–2). A functional group comprising, for example, a substituted silane, e.g., 3-aminopropyl-trimethoxysilane may be used to associate the cap compound and the quantum dot. Cap compounds may comprise a functional portion to associate with and/or to bond to the monomer and/or polymer, such as with functional groups thereof. In preferred embodiments, however, neither the quantum dot 12 nor the cap compounds 14 are covalently bound with the surrounding polymer matrix 11.

Quantum dots with cap compounds suitable for use in the present invention may be obtained commercially, e.g., from Quantum Dot Corp. of Hayward, Calif., or from Evident Technologies of Troy, N.Y. For instance, for quantum dots containing cadmium selenide, indium arsenide, and/or lead selenide obtained commercially, the organic cap compounds can include a trialkylphosphine, a trialkylphosphine oxide, diphenyl ether, or the like, depending upon the particular quantum dot core material and/or the shell coating layer thereon, if present.

1.2 Cap Exchange

In some cases, it may be desirable to exchange the cap compound 14 of a quantum dot 12 for another cap compound. For example, the quantum dot may be obtained commercially with a cap compound unsuitable for increasing the compatibility of the quantum dot with a particular polymer. In such cases, the quantum dots may be subjected to a cap exchange reaction to remove the undesirable caps and to provide the quantum dot with other, more desirable cap compounds Alternately, if the quantum dots are not capped at all, the quantum dots can be subject to an initial capping reaction.

A cap exchange reaction typically has two basic steps, which may or may not be performed separately from one another: (1) dissociating the existing cap compounds from the surface of the quantum dots, and (2) associating the quantum dots with one or more desired cap compounds. The step of dissociating may comprise precipitation, or "crashing out," of the existing cap compounds, e.g., by combining the quantum dots with a solvent so as to disassociate the existing cap compound from the quantum dots. The solvent may be an organic solvent, such as a hydroxyalkyl compound, e.g., methanol. The solubility of the cap compounds in preferred solvents is sufficiently low to precipitate the dissociated cap compounds. The dissociation step may include isolating the now uncapped quantum dots from the dissociated cap compounds, e.g., by filtration, centrifugation, decanting, or the like, or a combination thereof.

The step of associating preferably comprises a mass exchange step, in which the quantum dots are exposed to a solution having a molar excess of the desired cap compound under conditions that cause the cap compound to bond to the quantum dots. The quantum dots are preferably uncapped prior to the mass exchange step. The molar excess may be at least about a 5-fold excess, at least about a 10-fold excess, at least about a 20-fold excess, at least about a 25-fold excess, at least about a 30-fold excess, at least about a 50-fold excess, at least about a 75-fold excess, from about a 50-fold excess to about a 100-fold excess, or about a 90-fold excess. It should be noted that the reaction for capping the uncapped quantum dots may be identical with the step of associating. Upon completion of the association step, any excess unassociated cap compounds may be separated from the capped quantum dots, e.g., by precipitation and separation.

2. Polymer Matrices

As seen in FIG. 1, polymeric composition 10 comprises a polymer matrix 11, which comprises at least one type of polymer, and a plurality of quantum dots 12 uniformly dispersed within the polymer matrix 11. A suitable polymer matrix 11 comprises a plurality of polymer chains. Each polymer chain comprises a plurality of repeat units. Each of the polymer chains may be cross linked at least once or at least twice to at least one of the other polymer chains. Quantum dots are distributed among the polymer chains. Whether cross linked or not, the polymer matrix 11 has a sufficiently high viscosity to inhibit aggregation and/or sedimentation of quantum dots distributed therein. The polymer of the polymer matrix may be a copolymer.

Polymer chains of polymer matrix 11 preferably have a number $N^r$ repeat units. The number $N^r$ is preferably at least 5, at least 10, or at least 15. Thus, in some embodiments the polymer chains are oligomers, i.e., polymer chains having fewer than 5 repeat units. In other embodiments, the polymer chains of the polymer matrix have significantly more repeat units than an oligomer.

Preferred polymer matrices have optical properties that allow the polymeric composition to be used in the formation of optical devices operable within at least one window in the wavelength region of from 400 to about 1600 nanometers. For example, in the absence of quantum dots, polymer matrices of the invention may have optical attenuations of 0.4 dB cm$^{-1}$ or less, 0.3 dB cm$^{-1}$ or less, or 0.25 dB cm$^{-1}$ or less at a wavelength between about 800 and 1575 nm. Preferred polymers matrices preferably interfere as little as possible with optical properties of the quantum dots. In particular, preferred polymers matrices interfere as little as possible with the energy of luminescence that may be emitted by the quantum dots.

Polymer matrix 11 preferably comprises relatively few aliphatic carbon-hydrogen bonds in comparison with the total number of bonds within the polymer matrix 11. For example, the polymer of the polymer matrix may comprise a number $N^A$ aliphatic carbon-hydrogen bonds and a number $N^T$ total bonds. The ratio $N^A/N^T$ may be 0.25 or less, 0.15 or less, 0.1 or less, 0.05 or less, or 0.025 or less. The number $N^A$ may be zero. The numbers of bonds may be determined on a per repeat unit basis. If the polymer is a copolymer, the number of bonds may be determined as a weighted average of the number of bonds in the repeat units of the copolymer. In determining the number of bonds, aromatic and double bonds are counted as a single bond. Thus, for example, benzene comprises a total of 12 bonds: 6 carbon-carbon bonds and 6 carbon-hydrogen bonds. Cyclohexane comprises a total of 18 bonds: 6 carbon-carbon bonds and 12 carbon-hydrogen bonds.

The number of aliphatic carbon-hydrogen bonds of the polymer matrix may be smaller than the number of aromatic-carbon hydrogen bonds of the polymer matrix. For example, the polymer of the polymeric matrix may comprise a number $N^H$ total carbon-hydrogen bonds. The ratio $N^A/N^H$ may be 0.3 or less, 0.15 or less, 0.1 or less, 0.075 or less, or 0.025 or less. The numbers of bonds may be determined on a per repeat unit basis. If the polymer is a copolymer, the number of bonds may be determined as a weighted average of the number of bonds in the repeat units of the copolymer.

The monomer(s) and/or oligomer(s) from which the polymer matrix is formed may also comprise relatively few aliphatic carbon-hydrogen bonds in comparison with the total number of carbon-hydrogen bonds of the polymer monomer(s) and/or oligomer(s). For example, the monomer(s) and/or oligomer(s) that will be polymerized to prepare the polymeric matrix may comprise a number $N^A$ aliphatic carbon-hydrogen bonds and a number $N^T$ of total bonds. The ratio $N^A/N^T$ may be, for example, 0.25 or less, 0.15 or less, 0.1 or less, 0.05 or less, or 0.025 or less. The numbers of bonds may be determined on a per monomer basis. If the polymer is a copolymer, the number of bonds may be determined as a weighted average of the number of bonds in the various monomers.

The number of aliphatic carbon-hydrogen bonds of the monomer(s) and/or oligomer(s) from which the polymer matrix is formed may be smaller than the total number of carbon-hydrogen bonds the monomer(s) and/or oligomer(s). For example, the monomer(s) and/or oligomer(s) that will be polymerized to prepare the polymeric matrix may comprise a number $N^H$ total carbon-hydrogen bonds. The ratio $N^A/N^H$ may be 0.3 or less, 0.15 or less, 0.1 or less, 0.075 or less, or 0.025 or less. The numbers of bonds may be determined on a per monomer basis. If the polymer is a copolymer, the number of bonds may be determined as a weighted average of the number of bonds in the various monomers.

In one embodiment, the number of aliphatic carbon-hydrogen bonds of the polymer matrix may be smaller than the number of carbon-halogen bonds of the polymer matrix. For example, the polymer matrix may comprise a number $N^A$ aliphatic carbon-hydrogen bonds and a number $N^{Ha}$ of carbon-halogen bonds. The ratio $N^A/N^{Ha}$ may be 0.4 or less, 0.25 or less, 0.15 or less, or 0.1 or less. The numbers of bonds may be determined on a per repeat unit basis. If the polymer matrix is a copolymer, the number of bonds may be determined as a weighted average of repeat units. Some or all of the carbon-halogen bonds may be carbon-fluorine bonds. The monomer(s) and/or oligomer(s) from which the polymer matrix is formed may have a ratio $N^A/N^{Ha}$ of 0.4 or less, 0.25 or less, 0.15 or less, or 0.1 or less In general, materials suitable for preparing polymeric matrices of the invention may be referred to as polymerizable resins. Exemplary polymerizable resins comprise one or more monomers and/or one or more oligomers that may be polymerized to form a polymer matrix. The resin may comprise one or more solvents. The resin may comprise at least one of cross linking agents and initiators. Examples of suitable materials from which to prepare polymer compositions of the invention include perfluorocyclobutane (PFCB) monomer compounds including biphenylene di-perfluorovinyl ether, 1,1,1-tris(para-phenylene perfluorovinyl ether) ethane, 1,1,1-tris(para-phenylene perfluorovinyl ether)-2,2, 2-trifluoroethane, 2,2-bis(para-phenylene perfluorovinyl ether) propane (i.e., di-perfluorovinyl ether of bisphenol A), 2,2-bis(para-phenylene perfluorovinyl ether)-1,1,1-3,3,3-hexafluoropropane (i.e., di-perfluorovinyl ether of hexafluoro-bisphenol A), tris(para-phenylene perfluorovinyl ether) phosphine oxide, phenyl-bis(para-phenylene perfluorovinyl ether) phosphine oxide, 9,9-bis(para-phenylene perfluorovinyl ether) fluorene, para-phenylene-di-perfluorovinyl ether, hexafluoroisopropylidenic monomers, and the like, linear, branched, and/or dendritic oligomers thereof, and combinations thereof. Compounds such as the forgoing are examples of compounds that may form repeat units in polymers matrices of the present invention.

Polymers useful in the invention may comprise repeat units comprising aromatic groups cross linked by fluorinated carbon atoms. The fluorinated carbon atoms may be arranged in a ring, such as the perfluorocyclobutane rings of a PFCB polymer. Repeat units of preferred PFCB polymers comprise carbon atoms bound to 3 aromatic groups, such as a carbon atom bound to each of three different phenyl groups. Each of the aromatic groups includes a moiety capable of forming a perfluorocyclobutane ring linkage with the aromatic group of another repeat unit.

PFCB monomers and oligomers are known to polymerize merely by exposure to heat and typically without the presence of initiators, co-initiators, catalysts, chain transfer agents, chain terminators, and other additives. In addition, PFCB monomers and oligomers may be polymerized with relatively low amounts of solvent(s) present (e.g., less than about 50%, or less than about 40%, by weight), or even in bulk (i.e., with substantially no solvent present).

PFCB resins may be thermoplastic or thermoset, depending upon whether a difunctional monomer/oligomer is used or a multifunctional monomer/oligomer, respectively. In this context, the term "difunctional" means that the polymerization reaction proceeds at two ends of the monomer/oligomer, such that an essentially linear (co)polymer is formed. Also in this context, the term "multifunctional" means having a functionality of three or more, such that that the polymerization reaction proceeds at two end functional groups of the monomer/oligomer and from at least one other functional group, such that a branched, hyperbranched (dendritic), multi-armed star, graft, comb, or other non-linear (co) polymer is formed. Other fluorinated polymers suitable for use in certain embodiments of the present invention include fluoroacrylate, tetrafluoroethylene, perfluorovinyl ether copolymer, fluorinated polyimide, and perfluorovinyl ether cyclopolymer.

In one embodiment, the quantum dots comprise cap compounds comprising functional portions able to participate in a (co)polymerization reaction with the matrix material (e.g., when at least a portion of the cap material contains a perfluorovinyl ether moiety and when the matrix material is a PFCB resin material), which can advantageously result in the quantum dots being further stabilized to remain/retain uniformity of dispersion within the matrix material.

Preferred polymer matrix materials, after being polymerized and/or crosslinked (if applicable), exhibit one or more of the following characteristics: a low transmission loss at at least one wavelength between about 1000 nm and about 1600 nm; thermal stability (e.g., a glass transition temperature of at least about 100° C. or at least about 150° C.); a refractive index of from about 1.4 to about 1.6 at at least one wavelength between about 800 nm and 1600 nm; and a relatively low birefringence value (e.g., less than about 0.004).

3. Polymeric Compositions Comprising Quantum Dots

Polymeric compositions of the present invention are preferably prepared by preparing a mixture by combining a polymerizable resin, which may include a solvent, and a plurality of quantum dots, which preferably include cap compounds. The combining step preferably combines uniformly distributed the quantum dots throughout a least a portion of the polymerizable resin. Polymerization of the polymerizable resin in the mixture is initiated to form a polymer matrix comprising a plurality of quantum dots distributed therein. Polymerization is preferably thermally initiated, such as by heating the polymer resin to at least the boiling point of any solvent present. Prior to the completion of polymerization, the mixture may be spun onto a substrate or layer of cladding glass that is on top of the substrate prior to prepare a polymeric layer suitable for preparation of optical devices. Various aspects of these steps are discussed below.

As discussed above, preferred polymerizable resins comprise polyfluorocyclobutane monomers and/or oligomers and a solvent. Exemplary solvents include mesitylene, 1-methyl-2-pyrrolidinone, di-methyl sulfoxide, high boiling point hydrocarbons generally, and combinations thereof. The weight percent of resin in the mixture comprising the quantum dots is preferably at least about 20%. The weight percent of resin in the mixture is preferably less than about 75%.

Prior to initiating polymerization, the mixture (the combined quantum dots, polymerizable resin, and solvent (if present)) may be stirred, for example, for about 1 hour. Prior to polymerization the mixture may be filtered to prepare a filtered mixture. Filtering, such as through a 0.2 µm PTFE filter, removes any particulates or aggregated quantum dots, if present.

To prepare a layer of the polymeric composition, a small amount of the filtered mixture may be placed on a substrate or layer of cladding glass that is on top of the substrate and spun for about 1 minute, for example at about 1500 to 2500 rpm. Prior to spinning the substrate, the mixture may be allowed to stand for a minute or so upon the substrate. This is desirable where the substrate includes previously patterned features that are to be covered with the polymer composition. Polymerization of the spin-coated mixture is thermally initiated. During polymerization, the temperature may be ramped to reduce strain on the curing composition, e.g., at 110° C. for 1 hour ramping 3° C./min, 150° C. for 1 hour ramping 1° C./min, 165° C. for 3 hours ramping 1.5° C./min.

The quantum dots of a particular polymeric composition may be the same or may have different properties. For example, the quantum dots of a given polymeric composition may be different with respect to at least one of (a) core size, (b) core composition, (c) shell thickness, (d) shell composition, and (e) type of cap compound.

Polymeric compositions of the invention may comprise at least about 30% by weight polymer and at least about 0.1% by weight, at least about 0.5% by weight, or at least about 1% by weight of quantum dots. The polymeric compositions may comprise less than about 90% by weight polymer and about 10% or less, about 7.5% or less, about 5% or less, or about 3% or less by weight quantum dots. The weight of the quantum dots includes the mass of the cap compounds if present.

4. Optical Devices

Exemplary optical devices in accordance with the present invention include ridge waveguides and channel waveguides. Referring to FIG. 1, an optical ridge waveguide 24 comprises an optical core layer 26, a substrate layer 28, and an optical cladding layer 30. The substrate layer 28 also functions as an optical cladding layer. The laterally defined ridge 25 in the core layer 26 functions as the waveguide's optical core. The waveguide 24 may be used in optical devices such as splitters, wavelength multiplexers and demultiplexers, optical add/drop multiplexers, variable attenuators, switches, light sources, and more.

Core layer 26 comprises a polymeric composition including a polymer matrix and uniform distribution of quantum dots in the polymer matrix. The difference between the refractive indices of core layer 26 and the cladding layer 30 is selected so that internal reflections confine light propagating in the core layer 26 to remain in the core layer 26, i.e., the index is smaller in the cladding layer 30 than in the core layer 26. The cladding layer 30 preferably has a refractive index of less than about 1.5 at a wavelength between about 800 and 1600 nm. Due to the refractive index differences the lateral ridge 25 functions to guide light in the waveguide 24. The waveguide 24 of may be a single mode or multimode waveguide.

Preferred substrates comprise at least one of silica, quartz, glass, germanium, or other commonly microfabricated materials. The substrate layer 28 also has a refractive index that is smaller than that of the polymeric/quantum dot layer 26. This difference between the refractive indices of substrate 28 and the core layer 26 also confines light propagating in the core layer 26 to remain therein. In some embodiments, the substrate layer has a refractive index of less than about 1.5, for example less than about 1.45 at a wavelength between about 800 and 1600 nm. The polymeric/quantum dot layer 26 preferably has a refractive index of from about 1.45 to about 1.6, for example from about 1.48 to about 1.52 at a wavelength between about 1000 and 1600 nm.

Various layers of waveguide 24 may be formed by, for example, spin coating. Solutions of PFCB monomers suitable for spin coating may be prepared using solvents including mesitylene, 1-methyl-2-pyrrolidinone, di-methyl sulfoxide, high boiling point hydrocarbons generally, and combinations thereof Typically, the solution comprises at least 30% by weight monomer(s) and/or oligomer(s), at least about 0.1% by weight, at least about 0.5% by weight, at least 1% by weight quantum dots, with the remainder generally made up by solvent. The solution may comprise less than about 90% by weight monomer, about 10% or less, about 7.5% or less, about 5% or less by weight quantum dots, or about 3% or less by weight quantum dots, with the remainder generally made up by solvent. The weight of the quantum dots includes the mass of the cap compounds if present. Polymeric layers of from about 1 µm in thickness to about 20 µm in thickness may be prepared by spin coating such solutions.

Whether prepared by spin coating or an alternate technique, the polymeric layers comprising quantum dots may be patterned, e.g., to form ridge 25, using conventional techniques, such as lithographic mask-controlled etching, micromolding, microimprinting and the like. For example, features 0.5 µm and smaller may be prepared by direct micromolding using a silicon master. Reactive ion etching is an alternate technique for patterning of polymeric core layer 26 under the control of a mask to produce lateral ridge 25 therein.

The substrate layer 28 of the waveguide 24 may be at least about 1 μm thick, at least about 3 μm thick, or at least about 10 μm thick. The optical core may be a ridge 26 on a planar core layer 26 as shown in FIG. 3 or a waveguide core without an associated laterally wider planar core layer. In embodiments with a planar core layer 26, the core layer 26 may have a thickness of less than about 25 μm, for example less than about 15 μm, for example less than about 5 μm, such as about 2 μm or less. The ridge 25 preferably has a thickness greater than or less than the remaining portion of the core layer 26, if said remaining portion is present. For example, the ridge 25 may have a thickness of at least 1 μm, for example at least 2.5 μm, for example at least 5 μm (not including the thickness of the slab-like layer if present). The thickness of the ridge 25 may be less than 20 μm, for example less than 12 μm for example less than 8 μm (not including the thickness of the slab-like layer if present). A width of the ridge 25 may be at least 3 μm, for example at least 6 μm, for example at least 10 μm. The width of the ridge 25 may be less than 25 μm, for example less than 12 μm, for example less than 10 μm. The waveguide core may alternatively be configured as free-standing channel with similar dimensions. The cladding layer 30 may have a thickness of less than 25 μm, for example less than 12 μm, for example less than 10 μm.

5. EXAMPLES

5.1 Cap Exchange of CdSe/ZnS Quantum Dots

Two ml of a hexane solution comprising CdSe/ZnS quantum dots was added to a small flask. The quantum dot concentration was about $1.925 \times 10^{-5}$ mol/cm$^3$. The quantum dots comprised a CdSe core having a diameter of about 35 Å, a ZnS shell having a radial thickness of about 10 Å, and long chain alkane cap molecules, The quantum dots fluoresced in the visible portion of the electromagnetic spectrum. About 5 ml of methanol was added to the flask. The amount of methanol added was sufficient to separate the existing alkane cap molecules from the quantum dots. The separation of the existing cap molecules from the quantum dots may be referred to as "crashing out" the caps.

Following addition of methanol, the solution was agitated and then centrifuged for an amount of time sufficient to separate a solid phase comprising the uncapped quantum dots from a liquid phase comprising the methanol and a majority of the original cap molecules.

The liquid phase was removed and about 0.1 ml of thiophenol was added to the remaining quantum dots to prepare a mixture. The mixture was heated at 70° C. in an oil bath for 4 hours with magnetic stirring. During this time, thiophenol present in the mixture bonded to the uncapped quantum dots via a sulfur bond.

After heating, an amount of methanol sufficient to solubilize unassociated thiophenol was added to the mixture, which was then centrifuged to prepare a solid phase comprising the quantum dots with thiophenol caps. Each dots comprised a number of thiophenol caps estimated to be between about 10 and 150.

5.2 Preparation of a Polymer Composition Comprising CdSe/ZnS Quantum Dots With Thiophenol Caps The capped CdSe/ZnS quantum dots prepared in Example 5.1 were placed under nitrogen within a glove box. The methanol liquid phase was decanted.

About 1 g of polyfluorocyclobutane resin including mesitylene solvent was added to the quantum dots to prepare a mixture. The polyfluorocyclobutane resin contained monomers comprising a central carbon atom bound to each of three different phenyl groups. Each of the phenyl groups contained a moiety capable of forming a fluorocyclobutane linkage with an identical moiety of a phenyl group of another monomer.

The resin/solvent/quantum dot mixture was stirred for about 1 hour. It should be noted that the relative amount of resin and solvent may be different from that used in this example. For example, the weight percent of resin in the mixture may be lower, such as at least about 20% by weight. The weight percent of resin may be higher, such as less than about 75% by weight, for example about 60%. This is the case for any quantum dot/cap combination in accordance with the present invention.

A Si/SiO$_2$ wafer was cleaned using soap solution followed by rinses with water, acetone, and isopropanol. The wafer comprised a 15 μm thick coating of silica glass. The wafer was then blown dry and cleaned via reactive ion etching in oxygen plasma at 50 Watts, 0.5 torr for 30 seconds. The wafer was placed in the glove box.

The mixture resulting from stirring the resin, mesitylene, and quantum dots for one hour was filtered through a 0.2 μm PTFE filter. A pipette was used to place a small amount of solution on the cleaned wafer. (About 0.5 ml solution per 625 mm$^2$ of wafer is used.) The wafer was then spun at 2500 rpm for 40 seconds after ramping from 500 rpm. In any embodiment of the invention, the solution may be allowed to soak on the wafer for a minute or so prior to spinning if wafers using surface features, such as trenches, are present.

The wafer with spun overcoat was transferred to a nitrogen oven and cured as in Example 5.2.

5.3 Cap Exchange of InAs/CdSe/ZnS Quantum Dots

About 250 mg of InAs quantum dots were combined with 1.5 ml of toluene. The concentration of quantum dots was about $1.1 \times 10^{18}$ dots/cm$^3$. The quantum dots comprised a InAs core having a radius of about 35 Å, a CdSe first shell, a ZnS outer shell, and long chain alkane cap molecules. The InAs core had a composition and size to provide fluorescence in a wavelength region of from about 1300 nm to about 1500 nm. About 5 ml of methanol was added to the resulting mixture to separate the existing cap molecules from the quantum dots.

Following addition of methanol, the solution was agitated and then centrifuged for an amount of time sufficient to separate a solid phase comprising the quantum dots from a liquid phase comprising the methanol, the toluene, and a majority of the original cap molecules.

The liquid phase was removed and about 0.1 ml of benzoamine (aniline) was added to the remaining quantum dots to prepare a mixture. The mixture was heated at 70° C. in an oil bath for 4 hours with magnetic stirring. During this time, benzoamine present in the mixture associated with the quantum dots.

After heating, an amount of methanol sufficient to solubilize unassociated thiophenol was added to the mixture, which was then centrifuged to prepare a solid phase comprising the quantum dots with benzoamine caps.

5.4 Preparation of a Polymer Composition Comprising InAs/CdSe/ZnS Quantum Dots With Benzoamine Caps The capped InAs/CdSe/ZnS quantum dots prepared in Example 5.3 were placed under nitrogen within a glove box. The methanol liquid phase was decanted.

About 1 g of a polyfluorocyclobutane resin in mesitylene solvent was added to the quantum dots. The resin/solvent/quantum dot mixture was stirred for about 1 hour. The resin was the same as that used in Example 5.2.

A Si/SiO$_2$ wafer was cleaned using soap solution followed by rinses with water, acetone, and isopropanol. The wafer was then blown dry and subjected to reactive ion etching in oxygen plasma at 50 Watts, 0.5 torr for 30 seconds. The wafer was placed in the glove box.

The mixture resulting from stirring the resin, mesitylene, and quantum dots for one hour was filtered through a 0.2 μm PTFE filter. A pipette was used to place a small amount of solution on the glass surface of the cleaned wafer. The wafer was then spun at 2500 rpm for 40 seconds after ramping from 500 rpm.

The wafer with spun overcoat was transferred to a nitrogen oven and cured at 110° C. for 1 hour ramping at 3° C./min and 150° C. for four hours ramping at 1° C./min.

5.5 Preparation of a Polymer Composition Comprising PbSe Quantum Dots With Diphenyl Ether/Trialkyl Phosphine Caps About 13–35 mg of quantum dots comprising PbSe cores with tri-octylphosphine and oleic acid caps were combined under nitrogen with 1 g of PFCB resin (37% solid in mesitylene solvent). The resin was the same as that used in Example 5.2. The resulting mixture was stirred for 1 hour.

An Si/SiO$_2$ wafer was cleaned using soap solution, water rinse, acetone rinse, and isopropanol rinse, followed by air dry and reactive ion etching in oxygen plasma at 50 W, 0.5 torr for 30 seconds.

The solution of quantum dots and resin was filtered using a 0.2 μm PTFE filter. A small amount of solution was deposited onto the clean wafer. The wafer was spun at 2500 rpm, ramping from 500 rpm for 40 seconds. The resulting film was cured under nitrogen as in Example 5.2.

5.6 Preparation of Optical Waveguides

Ridge waveguides were fabricated using polymeric/quantum dot compositions of the invention. Formation of the ridge waveguides generally began by providing a substrate 28 having a 3–15 μm thick layer of glass. A polymeric/quantum dot composition was spun onto the glass. The composition was then cured, as in Example 5.2. Photo resist was applied to the cured layer and developed to form core layer 26. Oxygen plasma etching was used to remove unwanted composition leaving behind a lateral ridge 25 as shown in FIG. 3. A cladding layer 30 was spun over the ridge 25 and remaining portion of the core layer 26.

Channel waveguides may be prepared by a method including providing a substrate having an approximately 15 μm thick layer of glass. A pattern of channels is etched into the surface of the glass. Typical channels widths vary between 2 μm and 9 μm and depths of 3 μm. A polymeric/quantum dot composition is added to the glass with channels. After optionally being allowed to sit for about 1 minute, the composition and substrate are spun at 2500 rpm for 40 seconds with ramping from 500 rpm. The composition may be cured, as in Example 5.2. A cladding layer may be added.

For each type of waveguide, the cladding layer may comprise 60% GR, 37% BuOH; 3% PPA (phenylphosphonic acid), where GR is a 1:1:1 blend of methylsilsesquioxane, dimethylsilsesquioxane and phenyl silsessquioxane. The GR is a hybrid inorganic-organic composite. These silicon based organic polymers have been designed to be compatible with silicon based inorganics. The chemical formula is R—SiO$_{1.5}$ meaning that for every silicon atom there is 1.5 oxygen atoms. During curing the material fully condenses into a glassy network.

Upon curing the cladding layer, the wafers were cleaved and polished to reduce losses when coupling light to the waveguides. Light from a laser was coupled into the waveguides. Waveguiding behavior was observed.

All references cited herein are incorporated herein by reference in their entirety and for all purposes to the same extent as if each individual reference was specifically and individually indicated to be incorporated by reference in its entirety for all purposes. Citation of a reference is not to be construed as an admission that the reference is available as prior art against the present application. It is also noted that the Drawings are not to scale.

Many modifications and variations of the present invention may be made without departing from its spirit and scope, as will be apparent to those skilled in the art. For example, waveguides in accordance with the invention may be configured as fibers. The specific embodiments described herein are offered by way of example only, and the invention is to be limited only by the terms of the appended claims along with the full scope of equivalents to which such claims are entitled.

What is claimed is:

1. A composition of matter, comprising: a polymer matrix including polymer chains having a plurality of carbon halogen bonds; and a plurality of quantum dots distributed within the polymer matrix, wherein the quantum dots include at least one organic cap compound including at least one aromatic group.

2. The composition of matter of claim 1, including a polymer chain having at least 10 repeat units and that is cross linked at least twice to at least one of the other polymer chains.

3. The composition of matter of claim 1, wherein the polymer chains include aromatic groups.

4. The composition of matter of claim 1 wherein the polymer matrix includes a number $N^A$ aliphatic carbon-hydrogen bonds and a number $N^T$ total bonds, the ratio $N^A/N^T$ being less than about 0.4.

5. An optical waveguide including the composition of matter of claim 1.

6. The composition of matter of claim 1, in which the organic cap compound includes a halogen.

7. The composition of matter of claim 1, in which the polymer matrix includes a cyclic group having at least 3 carbon atoms.

* * * * *